US010884936B2

(12) United States Patent
Gupta et al.

(10) Patent No.: US 10,884,936 B2
(45) Date of Patent: Jan. 5, 2021

(54) UPDATING A TRACK FORMAT TABLE USED TO PROVIDE TRACK FORMAT CODES FOR CACHE CONTROL BLOCKS WITH MORE FREQUENTLY ACCESSED TRACK FORMAT METADATA

(71) Applicant: INTERNATIONAL BUSINESS MACHINES CORPORATION, Armonk, NY (US)

(72) Inventors: Lokesh M. Gupta, Tucson, AZ (US); Kyler A. Anderson, Sahuarita, AZ (US); Kevin J. Ash, Tucson, AZ (US); Beth A. Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 16/389,834

(22) Filed: Apr. 19, 2019

(65) Prior Publication Data

US 2020/0334158 A1    Oct. 22, 2020

(51) Int. Cl.
| | |
|---|---|
| *G06F 12/00* | (2006.01) |
| *G06F 12/0868* | (2016.01) |
| *G06F 12/0837* | (2016.01) |
| *G06F 16/907* | (2019.01) |
| *G06F 16/23* | (2019.01) |
| *G06F 12/123* | (2016.01) |

(52) U.S. Cl.
CPC ...... *G06F 12/0868* (2013.01); *G06F 12/0837* (2013.01); *G06F 16/2365* (2019.01); *G06F 16/907* (2019.01); *G06F 12/123* (2013.01)

(58) Field of Classification Search
CPC ............ G06F 12/0868; G06F 16/907; G06F 16/2365; G06F 12/0837; G06F 12/123
See application file for complete search history.

(56) References Cited

U.S. PATENT DOCUMENTS

| | | |
|---|---|---|
| 8,676,748 B2 | 3/2014 | Budaya et al. |
| 9,032,169 B2 | 5/2015 | Eastman et al. |
| (Continued) | | |

OTHER PUBLICATIONS

Anonymous, "Format Management of Bitwise Volume Storage", IP.com No. IPCOM000204670D, Mar. 9, 2011, 6 pp.

(Continued)

*Primary Examiner* — Gurtej Bansal
(74) *Attorney, Agent, or Firm* — Konrad Raynes Davda & Victor LLP; David W. Victor

(57) ABSTRACT

Provided are a computer program product, system, and method for updating a track format table used to provide track format codes for cache control blocks with more frequently accessed track format metadata. A track format table associates track format codes with track format metadata. Each instance of the track format metadata indicates a layout of data in a track. Cache control blocks for tracks in the cache include track format codes associated with the track format metadata of the tracks in the cache. Track format access information indicating accesses of track format metadata not included in the track format table. Track format metadata, indicated in the track format access information that is not in the track format table, is added to the track format table to associate with a track format code based on a number of accesses of the track format metadata indicated in the track format access information.

21 Claims, 7 Drawing Sheets

(56) References Cited

U.S. PATENT DOCUMENTS 10,158,894 B2 12/2018 Nair et al.
2019/0034304 A1 1/2019 Anderson et al.

OTHER PUBLICATIONS

Anonymous, "Record Level Change Tracking Included Within a Data Set", IP.com No. IPCOM000239805D, Dec. 2, 2014, 3 pp.
Anonymous, "Scalable Metadata for AIX Logical Volume Manager", IP.com No. IPCOM000202155D, Dec. 6, 2010, 2 pp.
Devulapalli, A., et al., "Integrating Parallel File Systems with Object-Based Storage Devices", Proceedings of the 2007 ACM/IEEE conference on Supercomputing, Nov. 2007, 10 pp.
IBM Corporation, "DFSMS Using Data Sets", Version 2, Release 3, Updated Jan. 14, 2019, 754 pp.
Yamazaki, T., et al., "Enterprise Storage Solutions", IBM Rebook, Dec. 1999, 376 pp.
U.S. Appl. No. 15/662,194, filed Jul. 27, 2017, 40 pp.

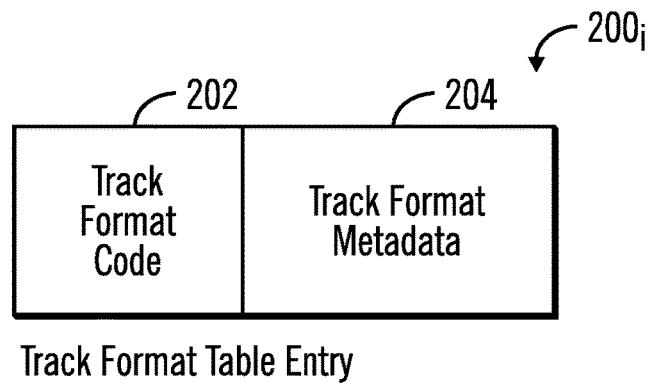
FIG. 2
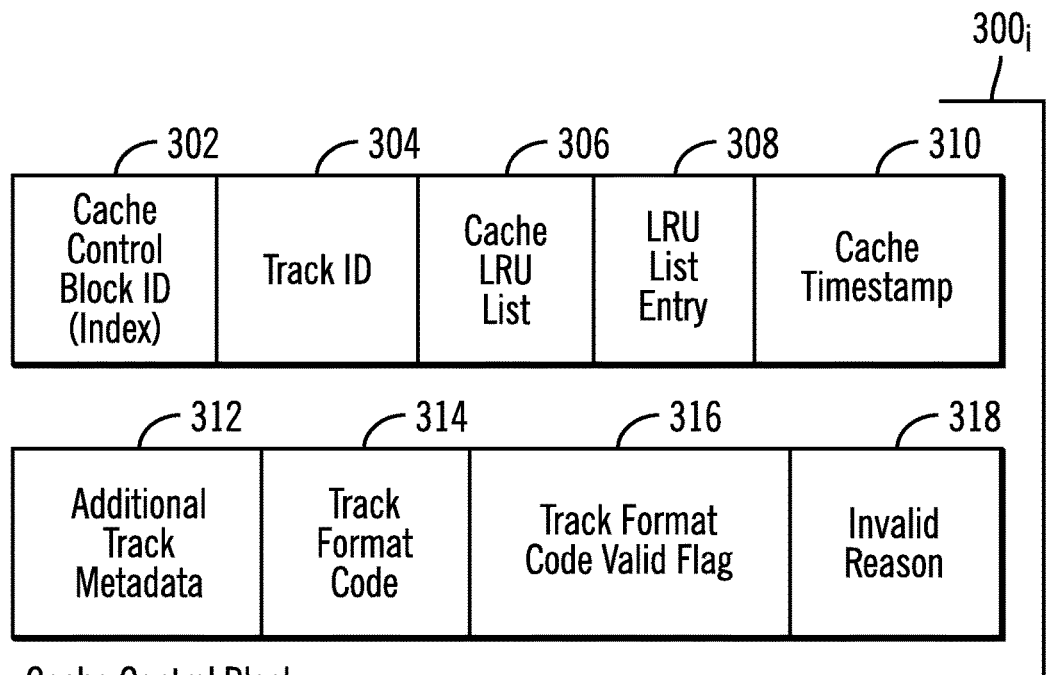
FIG. 3
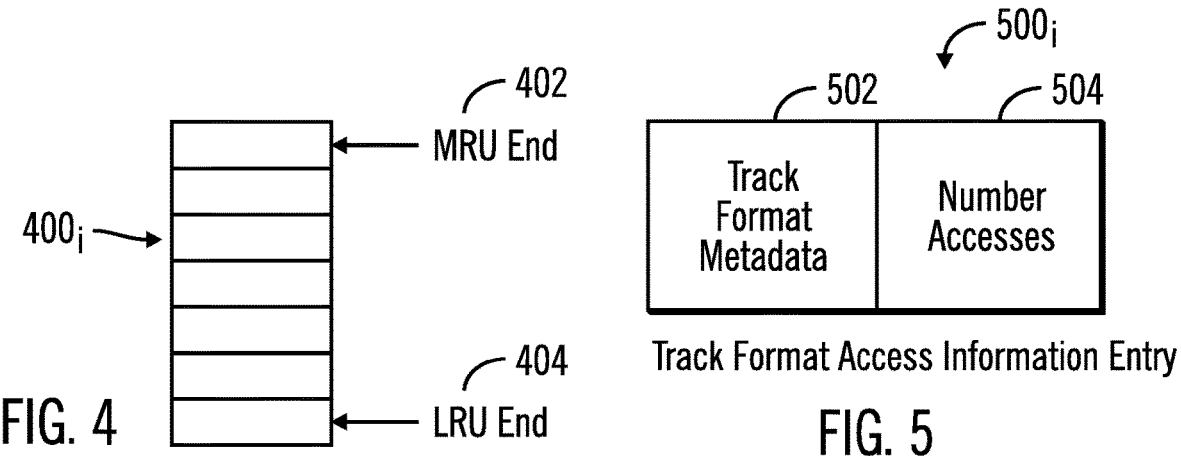
FIG. 4
FIG. 5

UPDATING A TRACK FORMAT TABLE USED TO PROVIDE TRACK FORMAT CODES FOR CACHE CONTROL BLOCKS WITH MORE FREQUENTLY ACCESSED TRACK FORMAT METADATA

BACKGROUND OF THE INVENTION

1. Field of the Invention

The present invention relates to a computer program product, system, and method for updating a track format table used to provide track format codes for cache control blocks with more frequently accessed track format metadata.

2. Description of the Related Art

In a storage environment, a host system may communicate a read/write request to a connected storage system over network channel through a network adaptor. If the data is in a cache of the storage system, i.e., a read hit, then the data may be returned quickly to the host system over a faster access channel, such as a bus interface. To improve the speed of processing read requests over a fast access channel, such as a bus interface, a cache control block may include a track format code representing track format metadata. A track format table may associate track format codes with track format metadata to allow fast access to the track format metadata using the track format code included in the cache control block. The use of the track format code avoids the need to stage in the track format metadata from storage, substantially reducing processing time of the read request over the bus interface.

There is a need in the art for improved techniques for managing the track format metadata included in the track format table to improve processing of requests.

SUMMARY

Provided are a computer program product, system, and method for updating a track format table used to provide track format codes for cache control blocks with more frequently accessed track format metadata. A track format table associates track format codes with track format metadata. Each instance of the track format metadata indicates a layout of data in a track. Cache control blocks for tracks in the cache include track format codes associated with the track format metadata of the tracks in the cache. Track format access information indicating accesses of track format metadata not included in the track format table. Track format metadata, indicated in the track format access information that is not in the track format table, is added to the track format table to associate with a track format code based on a number of accesses of the track format metadata indicated in the track format access information.

BRIEF DESCRIPTION OF THE DRAWINGS

FIG. 2 illustrates an embodiment of a track format table entry.

FIG. 3 illustrates an embodiment of a cache control block.

FIG. 4 illustrates an embodiment of a Least Recently Used (LRU) list of tracks in the cache.

FIG. 5 illustrates an embodiment of a track format access information entry.

DETAILED DESCRIPTION

Figure 1:
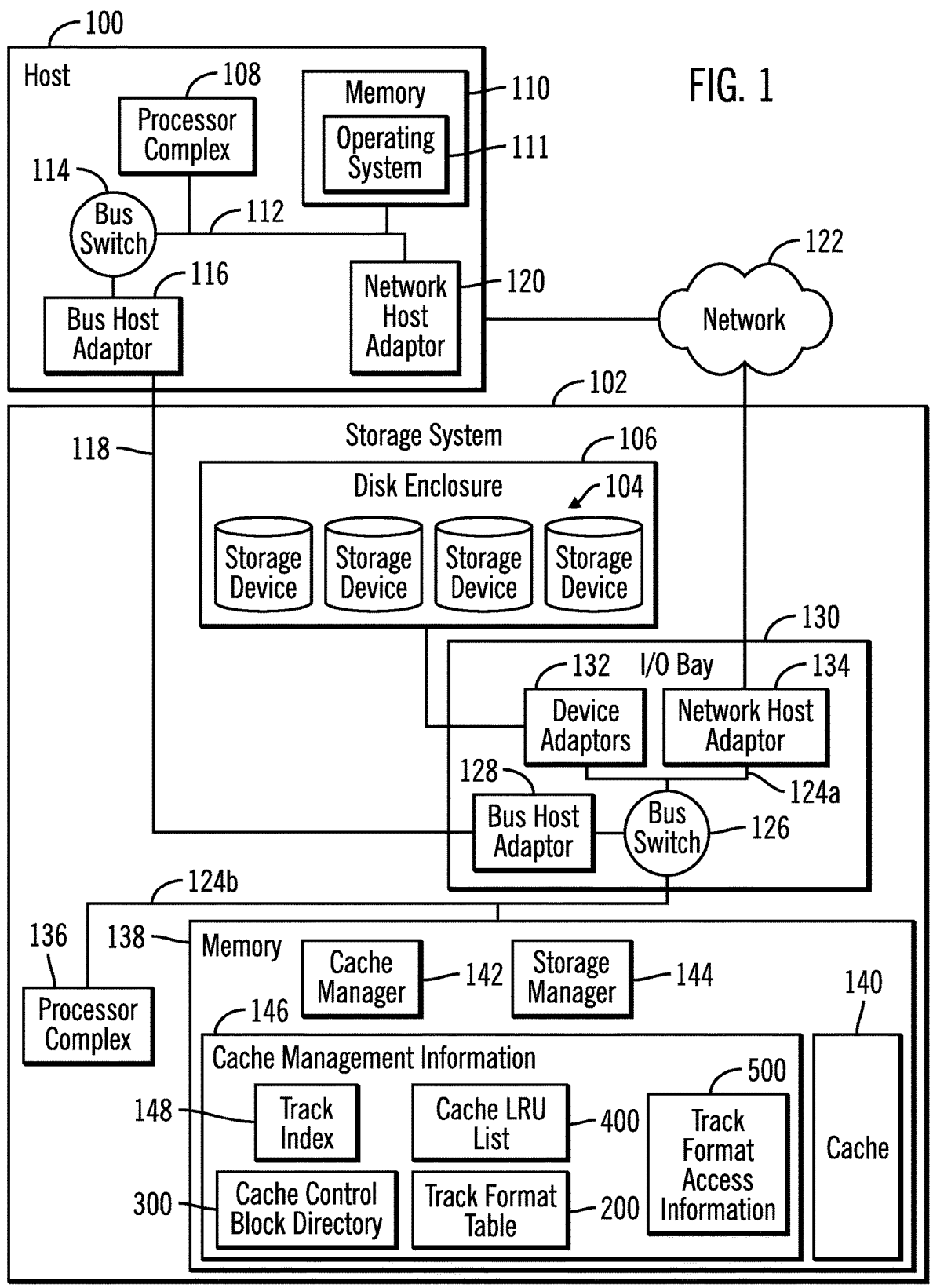
FIG. 1 illustrates an embodiment of a storage environment.

In a storage environment, a host system may first communicate a read/write request to a connected storage system over a fast channel, such as a bus interface, such as the Peripheral Component Interconnect Express (PCIe) interface. For a read/write request over the fast channel, also referred to as a first channel, which is supposed to complete within a threshold time, the host system holds the application thread for the read/write request in a spin loop waiting for the request to complete. This saves processor time associated with a context swap, which deactivates the thread and reactivates the thread in response to an interrupt when a response to the read/write request is received. If the data for the read/write request sent on the fast channel is not in cache, then the storage system may fail the read/write request and the host system may communicate the same read/write request over a storage area network via a host adaptor, which is slower than processing the I/O request over the bus, e.g., PCIe interface. Communicating the read/write request over the second channel requires the host system to perform a context switch from the task handling the read/write request to another task while waiting for the read/write request to complete. Context switching is costly because it requires the processor running the task to clear all registers and L1 and L2 caches for the new task, and then when completing the new task, reactivate the context switched task and return the state data to the registers and L1 and L2 caches for the task that was context switched while waiting for the read/write request to complete.

Certain read/write operations need to be completed within a threshold time, else they are failed. The storage system will have to access track metadata to process a request to a track. The track metadata provides information on the format of data and layout of records in the track that are needed in order to perform reads and writes to the track. However, the reading of the track metadata from the storage comprises a substantial portion of the latency in processing read/write request. Current implementations reduce cache operation latency by including a track format code in the cache control block for a track in the cache. This track format code may be used for fast access to the track format from a track format table without having to read the track metadata from storage. By eliminating the need to read the track metadata from a metadata track in storage to determine the track layout, described embodiments increase the likelihood that read/write requests on the first channel that need to be completed within a threshold time are completed by accessing the track layout information for a track from the track format table, associating track format codes with track format information for common track formats.

A read/write request to a target track on a channel requiring that the request be completed within a threshold time is processed if the track format code for the target track is within the cache control block for the target track. Using the track format code to access the track format metadata from the track format table reduces the latency of access to the track format metadata to allow the read/write request to complete within the time threshold. This keeps the time the host thread is spinning on the read/write request task for the read/write request sent on the bus interface within an acceptable time threshold. However, if the cache control block for the target track does not have a valid track format code, then the read/write request on the first channel is failed because it is unlikely the read/write request can complete within the threshold time given that the track format metadata will have to be retrieved from the storage. Failing the read/write request on the first channel, causes the host to redrive the read/write request on the second channel. The processing of the read/write request on the second channel reads in the track metadata from the storage to allow for processing the read/write request and adding the track format code to the cache control block for the target track.

A static track format table may not include track format codes for track format metadata that has recently become more frequently accessed. Read requests requiring this more recently frequently accessed track format metadata may not be serviced through the fast access first channel because there are no track format codes for the recently accessed track format metadata to include in the cache control blocks to allow for processing within the threshold time.

Described embodiments provide improvements to computer technology for managing the track format table having track format codes for track format metadata by providing track format access information having a number of accesses for track format metadata not included in the track format table. The number of accesses for track format metadata not included in the track format table is updated when the track format metadata is accessed. Periodically, track format metadata indicated in the track format access information as most frequently accessed is added to the track format table to associate with a track format code to use in cache control blocks. Further, less frequently accessed track format metadata, indicated in the track format access information, may be removed from the track format table to provide space for the more frequently accessed track format metadata. By including the most frequently accessed track format metadata in the track format table, cache control blocks for the most frequently accessed data will have a track format code to provide for faster processing within the threshold time to allow for processing on the fast access bus interface channel.

FIG. 1 illustrates an embodiment of a storage environment in which a host 100 directs read and write requests to a storage system 102 to access tracks in volumes configured in storage devices 104 in a disk enclosure 106. The host 100 includes a processor complex 108 of one or more processor devices and a memory 110 including an operating system 111 executed by the processor complex 108. The host operating system 111 generates read and write requests to tracks configured in the storage devices 104. The host 100 includes hardware to communicate read and write requests on two different channels. A first channel is a bus interface, such as a Peripheral Component Interconnect Express (PCIe), including a bus 112, a bus switch 114 to connect one or more devices on the bus 112, including the processor complex 108, a memory system 110, and a bus host adaptor 116 to extend the bus interface over an external bus interface cable 118 to the storage system 102. Additional bus interface technology to extend the bus interface may be utilized, including PCIe extender cables or components, such as a distributed PCIe switch, to allow PCIe over Ethernet, such as with the ExpEther technology. A second channel to connect the host 100 and storage system 102 uses a network host adaptor 120, connected to the bus 112, that connects to a separate network 122 over which the host 100 and storage system 102 additionally communicate. The first channel through the bus interface may comprise a faster access channel than the network 122 interface through the network host adaptor 120.

The storage system 102 includes a bus interface comprising a bus 124a, 124b, a bus switch 126 to connect to endpoint devices on the bus 124a, 124b, and a bus host adaptor 128 to connect to the external bus interface cable 118 to allow communication over the bus interface to the host 100 over the first channel. The storage system 102 includes an Input/Output bay 130 having the bus host adaptor 128, one or more device adaptors 132 to connect to the storage devices 104, and one or more network host adaptors 134 to connect to the network 122 and host systems.

The storage system 102 includes a processor complex 136 of one or more processor devices and a memory 138 having a cache 140 to cache tracks accessed by the connected hosts 100. The memory 138 includes a cache manager 142 and a storage manager 144. The storage manager 144 manages access requests from processes in the hosts 100 and storage system 102 for tracks in the storage 104. The devices 136, 138, 128, 132, and 134 connect over the bus interface implemented in the bus lanes 124a, 124b and bus switch 126.

The cache manager 142 maintains accessed tracks in the cache 140 for future read access to the tracks to allow the accessed tracks to be returned from the faster access cache 140 instead of having to retrieve from the storage 104. Further, tracks in the cache 140 may be updated by writes. A track may comprise any unit of data configured in the storage 104, such as a track, Logical Block Address (LBA), etc., which is part of a larger grouping of tracks, such as a volume, logical device, etc.

The cache manager 142 maintains cache management information 146 in the memory 138 to manage read (unmodified) and write (modified) tracks in the cache 140. The cache management information 146 may include a track format table 200 having track format codes for common track format descriptors providing details of a layout and format of data in a track; track index 148 providing an index of tracks in the cache 140 to cache control blocks in a control block directory 300; a Least Recently Used (LRU) list 400 for tracks in the cache 140; and track format access information 500 indicating a number of accesses for track format metadata instances not included and included in the track format table 200. The control block directory 300 includes the cache control blocks, where there is one cache control block for each track in the cache 140 providing metadata on the track in the cache 140. The track index 148 associates tracks with the cache control blocks providing information on the tracks in the cache 140. Upon determining that the cache LRU list 400 is full or has reached a threshold level, tracks are demoted from the LRU list 400 to make room for more tracks to stage into the cache 140 from the storage 104.

In certain embodiments, there may be multiple hosts 100 that connect to the storage system 102 over the first and second channels to access tracks in the storage devices 104. In such case, the storage system 102 would have at least one bus host adaptor 128 to connect to the bus interface 118 of each connected host 100 and one or more network host adaptors 134 to connect to the network host adaptors 120 on the hosts 100.

In one embodiment, the bus interfaces 112, 114, 116, 118, 124a, 124b, 126, and 128 may comprise a Peripheral Component Interconnect Express (PCIe) bus interface technology. In alternative embodiments, the bus interfaces 112, 114, 116, 118, 124a, 124b, 126, and 128 may utilize suitable bus interface technology other than PCIe. The bus host adaptors 116 and 128 may comprise PCIe host adaptors that provide the interface to connect to the PCIe cable 118. The network 122 may comprise a Storage Area Network (SAN), a Local Area Network (LAN), a Wide Area Network (WAN), the Internet, an Intranet, etc., and the network host adaptors 120, 134 provide the network 122 connections between the hosts 100 and storage system 102.

The storage system 102 may comprise a storage system, such as the International Business Machines Corporation (IBM®) D58000® and DS8880 storage systems, or storage controllers and storage systems from other vendors. (IBM and DS8000 are trademarks of International Business Machines Corporation throughout the world). The host operating system 111 may comprise an operating system such as Z Systems Operating System (Z/OS®) from International Business Machines Corporation ("IBM") or other operating systems known in the art. (Z/OS is a registered trademark of IBM throughout the world).

The storage devices 104 in the disk enclosure 106 may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAIVI), spin transfer torque memory (STT-RAM), conductive bridging RAM (CBRAM), magnetic hard disk drive, optical disk, tape, etc. Volumes in a storage space may further be configured from an array of devices, such as Just a Bunch of Disks (JBOD), Direct Access Storage Device (DASD), Redundant Array of Independent Disks (RAID) array, virtualization device, etc. Further, the storage devices 104 in the disk enclosure 106 may comprise heterogeneous storage devices from different vendors and different types of storage devices, such as a first type of storage devices, e.g., hard disk drives, that have a slower data transfer rate than a second type of storage devices, e.g., SSDs.

FIG. 2 illustrates an embodiment of a track format table entry $200_i$ in the track format table 200, which includes a track format code 202 and the track format metadata 204. In certain embodiments Count Key Data (CKD) track embodiments, the track format metadata 204 may comprise a track format descriptor (TFD) indicating a number of records in the track, a block size, a number of blocks in the track, a data length of each of the records, and a control interval size indicating an amount of data that is read or written atomically as a unit, number of blocks in a control interval, and whether a control interval spans two tracks, and other information. The track format code 202 may comprise an index value of the index entry $200_i$ in the track format table 200. For instance, if there are 32 track format table entries $200_i$, then the track format code 202 may comprise 5 bits to reference the different possible number of 32 entries $200_i$.

FIG. 3 illustrates an embodiment of a cache control block $300_i$ for one of the tracks in the cache 140, including, but not limited to, a cache control block identifier 302, such as an index value of the cache control block $300_i$; a track ID 304 of the track in the storage 104; the cache LRU list 306 in which the cache control block $300_i$ is indicated; an LRU list entry 308 at which the track is indicated; a cache timestamp 310 indicating a time the track was added to the cache 140 and indicated on the LRU list 306; additional track metadata 312 typically maintained for tracks stored in the cache 140, such as a dirty flag indicting whether the track was modified; a track format code 314 comprising one of the track format codes 202 of the track format metadata 204 describing the layout of data in the track 304 represented by the cache control block $300_i$; a track format code valid flag 316 indicating whether the track format code 314 is valid or invalid; and an invalid reason 318 indicating a reason for the track format code valid flag 316 code being invalid, as indicated in the track format code valid flag 316.

FIG. 4 illustrates an embodiment of an LRU list $400_i$, such as having a most recently used (MRU) end 402 identifying a track most recently added to the cache 140 or most recently accessed in the cache 140 and a least recently used (LRU) end 404 from which the track identified at the LRU end 404 is selected to demote from the cache 140. The MRU end 402 and LRU end 404 point to track identifiers, such as a track identifier address or a cache control block index for the track, of the tracks that have been most recently added and in the cache 140 the longest, respectively, for tracks indicated in that list 400.

FIG. 5 illustrates an embodiment of a track format access information entry $500_i$ in the track format access information 500, which includes track format metadata 502 and a number of accesses 504 of the track format metadata 502, such as a number of times the track format metadata 502 was accessed during a read or write operation. As discussed, the track format metadata 502 may comprise a track format descriptor (TFD) indicating a number of records in the track, a block size, a number of blocks in the track, a data length of each of the records, and a control interval size indicating an amount of data that is read or written atomically as a unit, number of blocks in a control interval, and whether a control interval spans two tracks, and other information.

Figure 6:
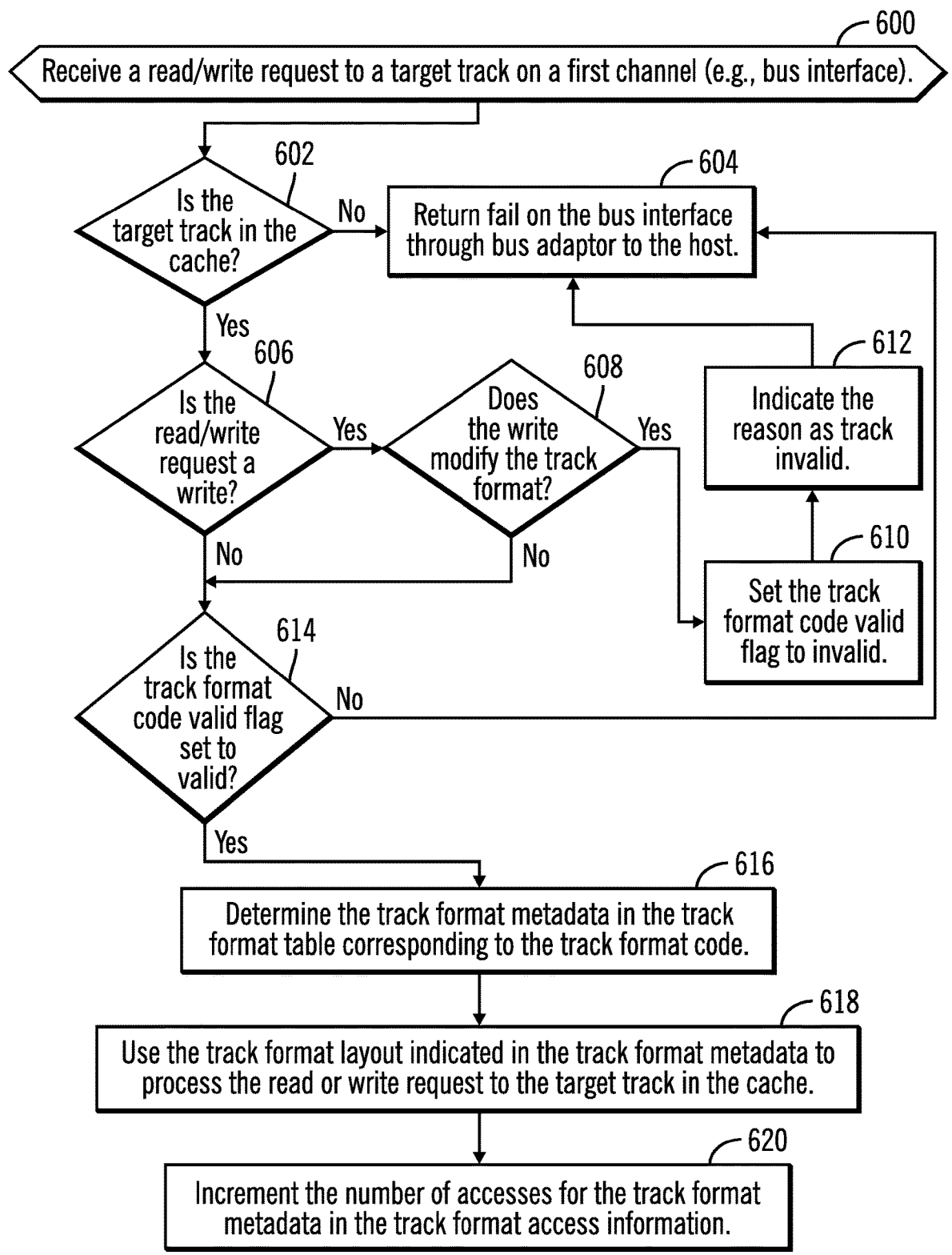
FIG. 6 illustrates an embodiment of operations to process a read/write request received on a first channel, such as a bus interface.

FIG. 6 illustrates an embodiment of operations performed by the cache manager 142 and storage manager 144 to process a read/write request to a target track received on a first fast channel, such as the PCIe bus interface via bus host adaptor 128. Upon receiving (at block 600) the read/write request at the bus host adaptor 128, if (at block 602) the target track is not in the cache 140, then the storage manager 144 returns (at block 604) fail to the read/write request on the first channel or bus host adaptor 128 to the host 100, which causes the host 100 to retry the read/write request on the second channel or network host adaptor 120, 134. Failure is returned because if the target track is not in the cache 140, then the target track and track metadata needs to be staged into cache 140, which would likely exceed the time threshold for read/writes on the first channel, where the host processor is spinning on the thread of the read/write request. If (at block 602) the target track is in the cache 140 is a write and if (at block 608) the write modifies the track format, then the cache manager 142 sets (at block 610) the track format code valid flag 316 to invalid and indicates (at block 612) the invalid reason 318 that the track in the cache 140 was invalidated as track format change. The storage manager 144 then returns (at block 604) fail to the host 100 because the track metadata needs to be read from the storage 104 to update with the modified track format.

If (at block 606) the read/write request is a read or if (at block 608) the request is a write that does not modify the track format, then the cache manager 142 determines (at block 614) if the track format code valid flag 316 is set to valid. If so, then the cache manager 142 determines (at block 616) the track format metadata 204 in the track format table 200 corresponding to the track format code 314 in the cache control block 300$_i$. The cache manager 142 uses (at block 618) the track format layout indicated in the determined track format metadata 204 to process the read or write request to the target track in the cache 140. If the request is a write, a dirty flag 312 in the cache control block 300$_i$ may be set to indicate the track is modified. If (at block 614) the track format code valid flag 316 is invalid, meaning there is no fast access to track format information available through the track format code 314, then the storage manager 144 returns (at block 604) fail on the bus interface to the bus host adaptor 128 because the track format table 200 cannot be used, and the track metadata needs to be read from the storage 104, which would introduce too much latency for the fast read/write on the first channel. The number of accesses 504 in the entry 500$_i$ in the track format access information 500 for the determined track format metadata 502 just accessed and used is incremented (at block 620).

With the embodiment of operations of FIG. 6, during a fast write over the bus interface or first channel, if the track format metadata may be accessed without latency through the track format table 200, then the read/write request is allowed to proceed when the transaction can be processed very quickly because the track metadata can be obtained directly from the track format table 200 through the track format code 314, without having to read the track metadata from storage 104. However, if the cache control block 300$_i$ does not have a valid track format code 314 to allow low latency access of track format metadata, then the read/write request is failed because the transaction will not likely complete within a fast time threshold. This determination is important to avoid host delays in processing other tasks while the host processor is spinning on the thread handling the read/write request while waiting for the read/write request to complete. If the track metadata can be accessed from the track format table 200 than there is a high likelihood the read/write can complete on the bus interface channel within the time required to avoid the host processor holding the thread for too long, which causes other I/O requests to be queued and delayed. If the track metadata cannot be accessed from the track format table 200 and needs to be read from the storage 104, then it is unlikely the read/write request will complete within the time threshold for the host processor to spin on the thread for the read/write request, and failure is returned. Returning failure when the track metadata cannot be obtained from the track format table 200 causes the host thread waiting on the read/write request task to be deactivated and the host processor may context switch to processing other tasks, and then the read/write request is retried on the second network channel during the context switch.

Figure 7:
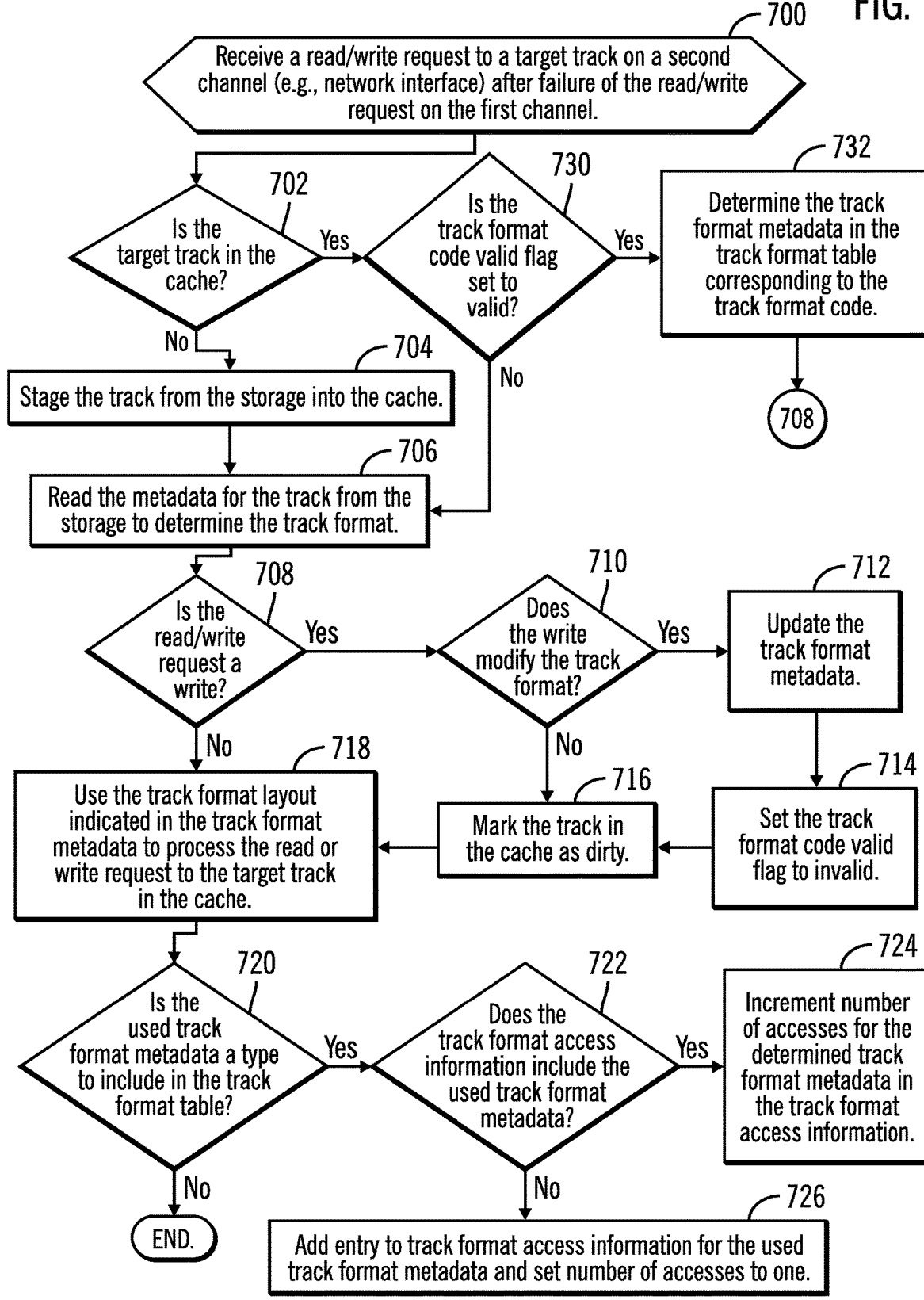
FIG. 7 illustrates receive an embodiment of operations to process a read/write request received on a second channel, such as a network.

Further, with the embodiment of FIG. 6, the number of accesses 504 for the track format metadata 502 just accessed is incremented to reflect the frequency of use of the track format metadata whose track format code was included in the cache control block FIG. 7 illustrates an embodiment of operations performed by the cache manager 142 and storage manager 144 to process a read/write request to a target track received on a second channel, such as the network 122 on network host adaptor 134. Upon receiving (at block 700) the read/write request, if (at block 702) the target track is not in the cache 140, then the cache manager 142 stages (at block 704) the track from the storage 104 to the cache 140 and reads (at block 706) the track metadata for the target track from the storage 104 to determine the track format, e.g., size of blocks, control interval, layout of records on the track, etc. If (at block 708) the read/write request is a write and if (at block 710) the write modifies the track format, then the cache manager 142 updates (at block 712) the track metadata to indicate the modified track format and sets (at block 714) the track format code valid flag 316 to invalid. The track metadata 312 is further updated (at block 716) to indicate the track is modified or dirty. If (at block 708) the request is a read or from block 616, the cache manager 142 uses (at block 718) the track format layout indicated in the track format metadata to process the read or write request to the target track in the cache 140.

After processing the read or write request using the track format metadata (at block 718), the cache manager 142 determines (at block 720) whether the used track format metadata is of a type of metadata to include in the track format table 200. In one embodiment, metadata of type that is not included in the track format table 200 may comprise metadata having irregular formats, such as metadata that includes records that cannot be represented using one bit, such as has records of varying length which require more than one bit to specify the length of each record. If (at block 720) the used track format metadata is of a type to include in the track format table 200, then if (at block 722) the track format access information 500 includes an entry 500$_i$ for the used track format metadata, then the number of accesses 504 for the used track format metadata 502 is incremented (at block 724). If (at block 722) the track format access information 500 does not include an entry 500$_i$ for the used track format metadata, then an entry 500$_i$ is added (at block 726) to the track format access information 500 and the number of accesses 504 for the added entry 500$_i$ is set to one.

If (at block 702) the target track is in the cache 140 and if (at block 730) the track format code valid flag 316 is set to valid, then the cache manager 142 determines (at block 732) the track format metadata 204 in the track format table 200 corresponding to the track format code 314 in the cache control block 300$_i$ for the target track. From block 732, control proceeds to perform (at block 734) blocks 708 through 714 to use the determined track format metadata corresponding to track format code in the cache control block 300$_i$. If (at block 730) the track format code valid flag 316 is set to invalid, then control proceeds to block 706 to read the metadata for the track form the storage 104 to determine the track format layout. If the target track is in the cache 140, then when proceeding to block 720 and 722, the used track format metadata would already be in the track format access information 500 because the track format code 314 for the track format metadata was included in the cache control block 300$_i$.

With the embodiment of FIG. 7, when the read/write request is received on the second slower channel, such as over the network 122, where the host operating system 111 would have performed a context switch for the thread handling the read/write request, the cache manager 142 may read the track metadata from the storage 104 to determine the track layout to process the request. During this time, the host processing of further host requests is not delayed because the host thread handling the read/write request is context switched and not active, until the read/write request returns complete.

Further, in FIG. 7, if the determined track metadata was for a track that had to be staged into the cache 140, then an entry may be added to the track format access information 500 if not already included in the track format access information 500 to allow for tracking of the number of accesses of that track format metadata. This added entry 500$_i$ to the track access information may be subsequently used to determine whether that track format metadata should be added to the track format table 200 so that cache control blocks 300$_i$ for tracks having that track format metadata may use the track format code 314 for that track format metadata to allow that read/write requests to be processed on the faster first channel or bus host adaptor 128 to the host 100.

Figure 8:
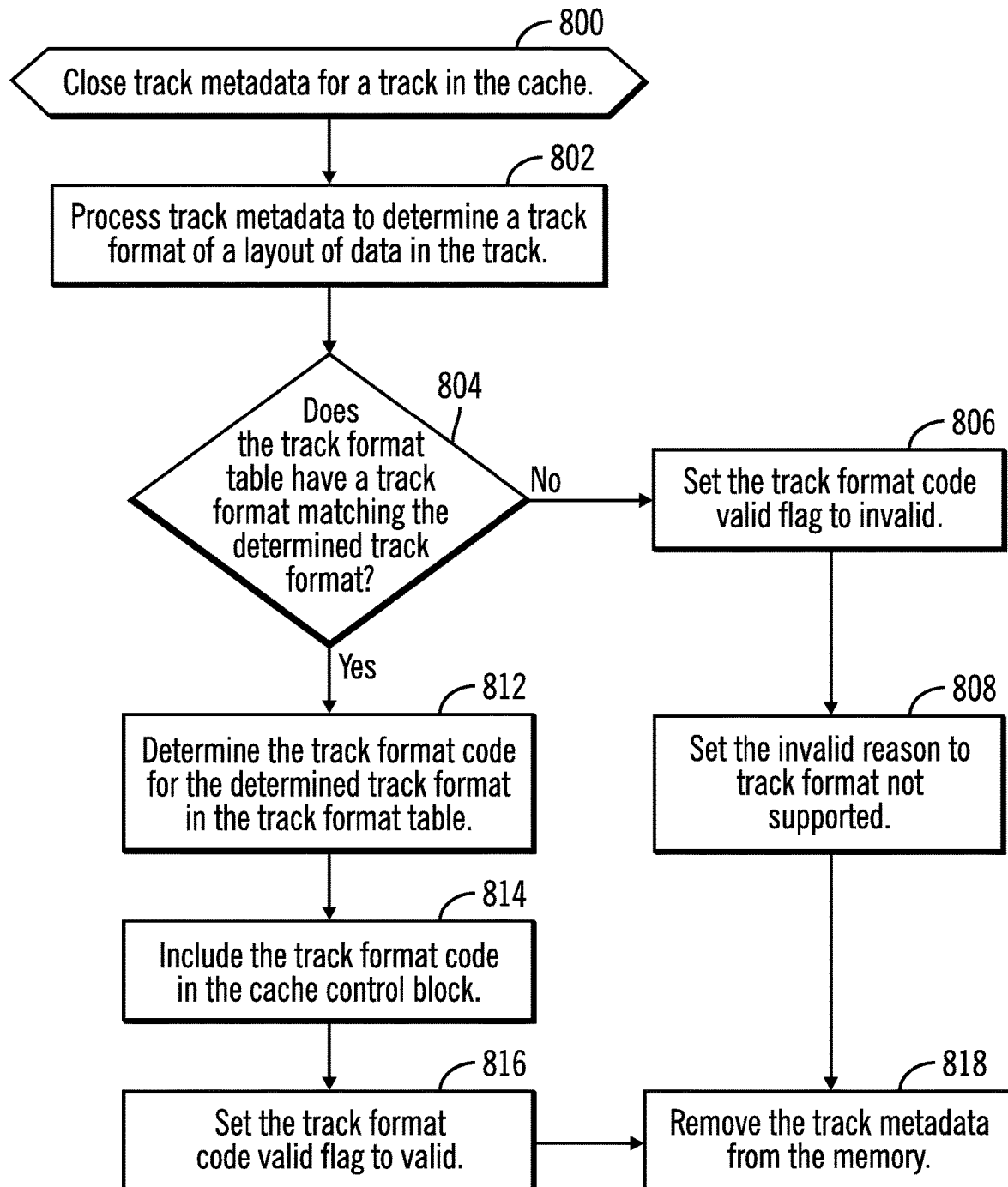
FIG. 8 illustrates an embodiment of operations to close track metadata and determine a track format code for the track in cache of the closed track metadata.

FIG. 8 illustrates an embodiment of operations performed by the cache manager 142 when closing the track metadata for a track in the cache 140, which involves destaging the track metadata to the storage 104 if changed. Upon closing (at block 800) the track metadata for a track in the cache 140, the cache manager 142 processes (at block 802) the track metadata to determine a track format or a layout of data in the track. If (at block 804) the track format table 200 does not have a track format metadata 204 matching the determined track format from the track metadata, which may happen if the determined track format is irregular, then the track format code valid flag 316 is set (at block 806) to invalid and the invalid reason 318 is set to indicate that the track format is not supported. In such situation, read/write requests to the track having an irregular format are only processed when received through the second channel via network host adaptor 134.

If (at block 804) the track format table has a track format metadata 204 matching the determined track format from the track metadata, then the cache manager 142 determines the track format code 202 for the determined track format metadata 204 in the track format table 200 and includes the track format code 202 in the field 314 in the cache control block 300$_i$. The track format code valid flag 316 is set (at block 816) to valid. From block 808 or 816, control proceeds to block 818 to destage the track metadata from the memory 138 if modified or discard if not modified.

With the operations of FIG. 8, the track format information may be indicated in the cache control block 300$_i$ with a track format code 202 having a limited number of bits to index track format metadata 204 describing track layout in a track format table 200, where the track metadata itself would not fit into the cache control block 300$_i$. For future read/write accesses, if a valid track format code 314 is provided, then the cache manager 142 may use that code 314 to obtain with low latency the track format metadata 204 from the track format table 200 without having to read the track metadata from the storage 104 and process to determine the track format.

Figure 9:
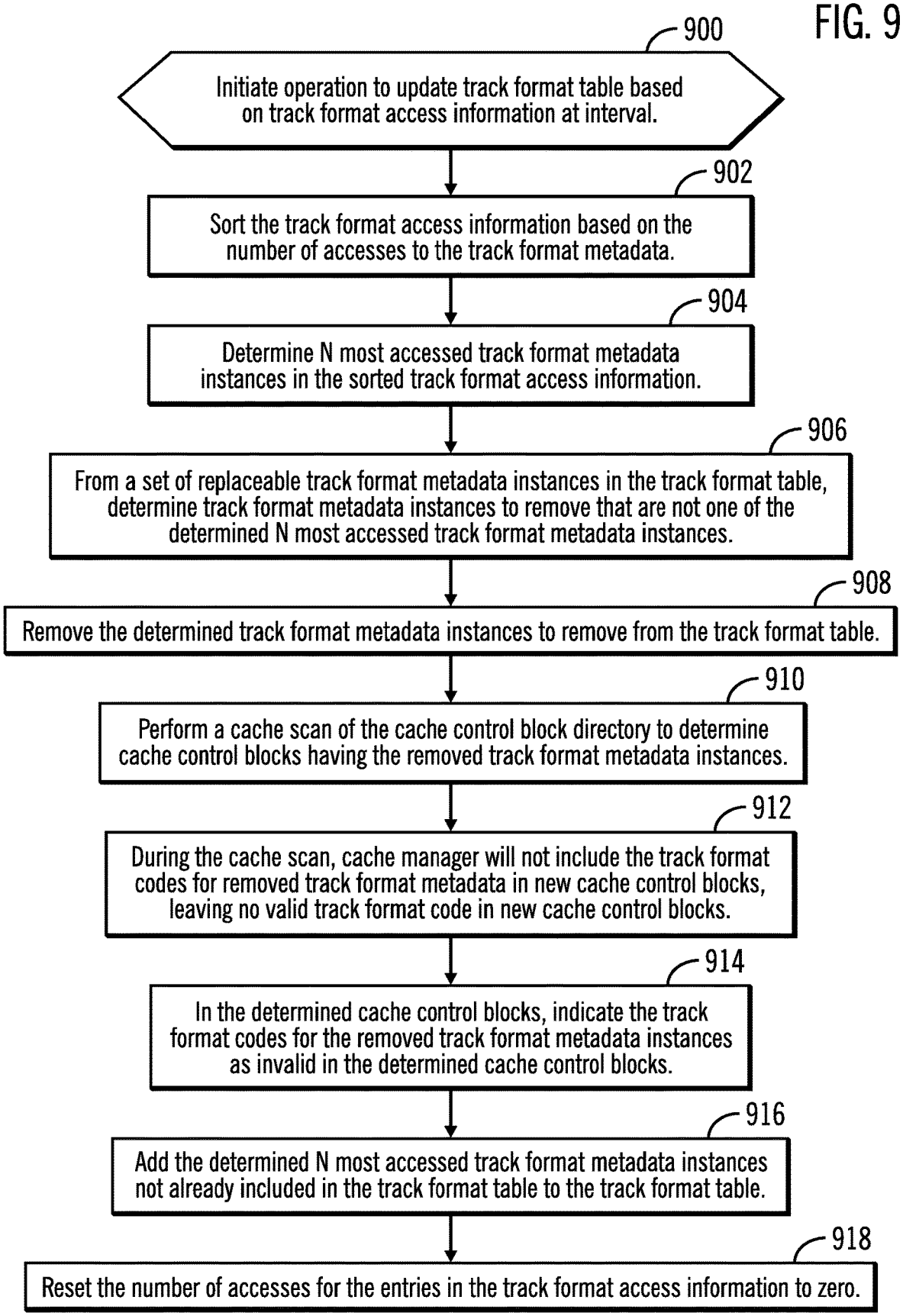
FIG. 9 illustrates an embodiment of operations to periodically update the track format metadata in the track format table based on track format access information.

FIG. 9 illustrates an embodiment of operations periodically performed, such as at an interval, by the cache manager 142 to update the track format table 200 with entries for track format metadata indicated in the track format access information 500 having a high number of accesses. Upon initiating operation to update the track format table 200 at an interval, the cache manager 142 sorts (at block 902) the track format access information entries 500$_i$ based on the number of accesses 504 to the track format metadata 502. A determination is made (at block 904) of N of the most accessed track format metadata instances in the sorted track format access information 500. In one embodiment, a subset of entries in the track format table 200 may be static, in that they are not replaced or removed, and another subset of entries in the track format table 200 may be dynamic and available to replace with more frequently accessed track format metadata. Thus, in an embodiment where N comprises the number of all the entries in the track format table 200, the track access information 500 may include N entries for all the track format metadata instances in the track format table 200 to replace. In the embodiment where N comprises the subset of dynamic track metadata instances in the track format table, the track format access information 500 may include N entries for those replaceable dynamic track metadata instances, but no entries for the static track metadata instances in the track format table 200 that are not subject to replacement based on the number of accesses.

The cache manager 142 determines (at block 906), from a set of replaceable track format metadata instances in the track format table 200, track format metadata instances to remove that are not one of the determined N most accessed track format metadata instances. Replaceable track format metadata instances may comprise all the entries in the track format table 200 if there are no static entries, or a subset of the entries in the track format table 200 that are dynamic, and not static. The determined track format metadata instances 200$_i$ in the track format table 200, not included in the N most accessed track format metadata instances, are removed (at block 908) from the track format table 200. This leaves in the track format table 200 undisturbed those track format metadata instances 200$_j$ that are included in the N most accessed track format metadata instances in the track format access information 500. A cache scan is performed (at block 910) of the cache control block directory 300 to determine cache control blocks 300$_i$ having the track format code 202 of the track format metadata instances to remove. During the cache scan, the cache manager 142 (at block 912) will not include the track format codes 202 for removed track format metadata 204 in new cache control blocks 300$_i$, leaving no valid track format code 314 in further new cache control blocks 300$_i$. The track format codes 202 for the removed track format metadata instances present in field 314 of cache control blocks 300$_i$ are indicated (at block 914) as invalid in valid flag 316, because that track format code 202 is no longer available in the track format table 200 to associate with track format metadata 204. The invalid reason 318 in the cache control block 300$_i$ may be specified as removed from track format table 200. The determined N most accessed track format metadata instances not already included in the track format table 200 are added (at block 916) to the track format table 200. The number of accesses 504 for the entries 500$_i$ in the track format access information 500 are reset (at block 918) to zero, to allow for recording of accesses for the next interval period.

With the embodiment of FIG. 9, the track format access information 500 is used to replace track format metadata in the track format table 200 with more recently accessed track format metadata. This increases the likelihood that there is a track format code 202 to include in a cache control block 300$_i$ to increase the likelihood that read/write requests will be serviced on the first channel through the bus interface 118 that comprises a faster access channel than the network 122 interface, because the track format metadata can be accessed using the track format code 314 without having to stage and read track format metadata into cache 140. In this way, the updating of the track format table 200 with more frequently accessed track format metadata 200$_i$ increases the likelihood the faster access bus interface 118 channel can be used to improve I/O request performance.

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
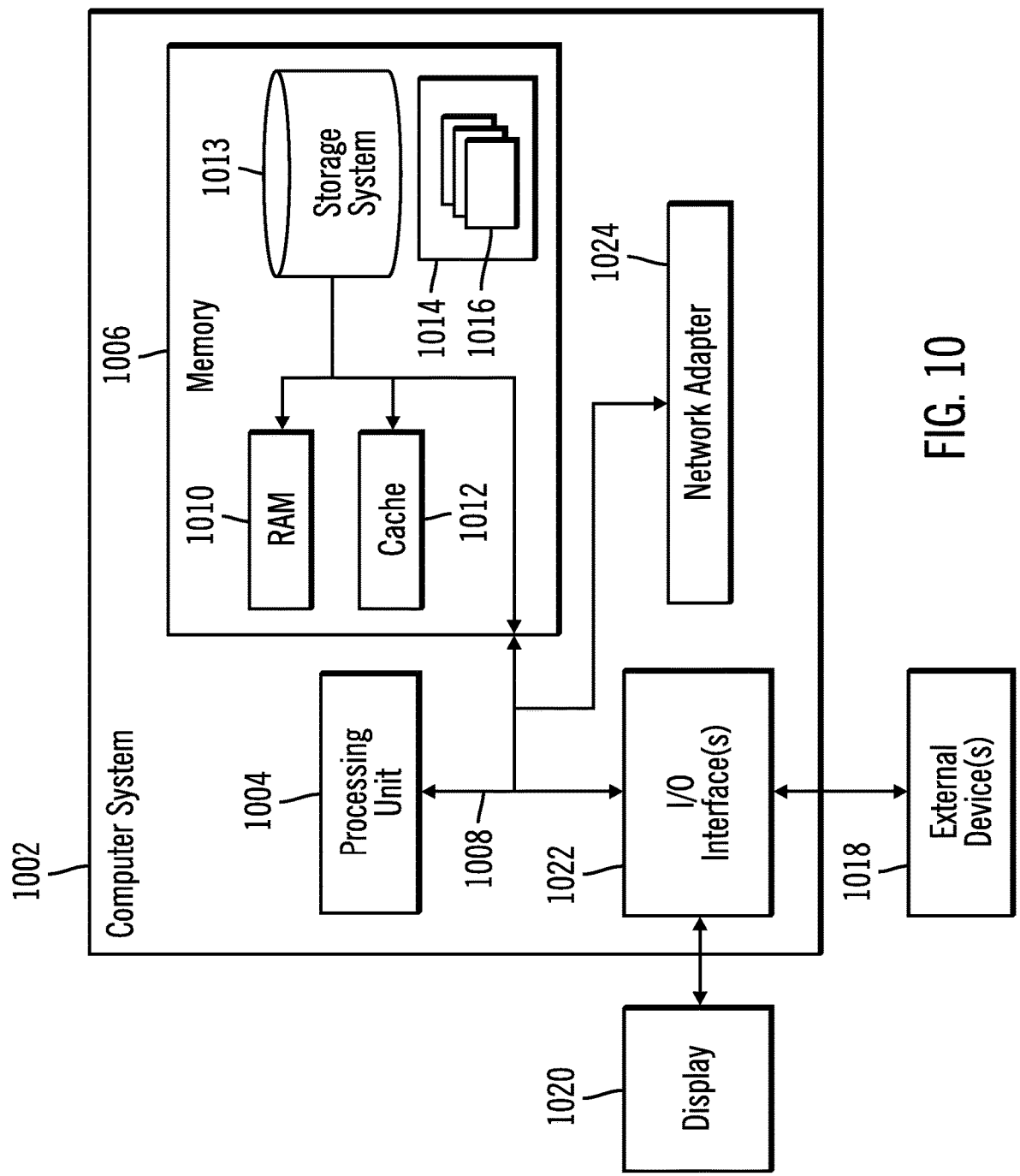
FIG. 10 illustrates an embodiment of a computer architecture used with described embodiments.

The computational components of FIG. 1, including the host 100 and storage system 102 may be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing read and write requests from a host to tracks in storage cached in a cache, the computer program product comprising a computer readable storage medium having computer readable program code embodied therein that is executable to perform operations, the operations comprising:
   maintaining a track format table associating track format codes with track format metadata, wherein each instance of the track format metadata indicates a layout of data in a track, and wherein cache control blocks for tracks in the cache include track format codes associated with the track format metadata of the tracks in the cache;
   maintaining track format access information indicating accesses of track format metadata not included in the track format table; and
   adding track format metadata, indicated in the track format access information that is not in the track format table, to the track format table to associate with a track format code based on a number of accesses of the track format metadata indicated in the track format access information.

2. The computer program product of claim 1, wherein the track format access information indicates a number of accesses of track format metadata included in the track format table, wherein the operations further comprise:
   determining, from the track format access information, a number of track format metadata instances having a greatest number of accesses, wherein the added track format metadata not in the track format table comprises the determined number of track format metadata instances having the greatest number of accesses not included in the track format table.

3. The computer program product of claim 2, wherein the operations further comprise:
   after a time interval, sorting the track format metadata instances in the track format access information based on the number of accesses to the track format metadata to determine a plurality of most accessed track format metadata instances;
   removing track format metadata instances in the track format table not in the determined most accessed track format metadata instances having the greatest number of accesses; and
   adding to the track format table the determined most accessed track format metadata instances from the track format access information not already included in the track format table.

4. The computer program product of claim 2, wherein the operations further comprise:
   removing from the track format table the track format metadata instances not included in the determined number of track format metadata instances having the greatest number of accesses.

5. The computer program product of claim 4, wherein the operations further comprise:
   indicating track format codes, for the track format metadata removed from the track format table, in cache control blocks as invalid.

6. The computer program product of claim 5, wherein the operations further comprise:
   receiving a read or write request to a target track from the host on a first channel connecting to the host;
   determining whether the target track is in the cache;
   determining whether a cache control block for the target track includes a valid track format code from the track format table in response to determining that the target track is in the cache; and
   failing the read or write request in response to determining that the target track is not in the cache or determining that the cache control block does not include a valid track format code, wherein the failing the read or write request causes the host to resend the read or write request to the target track on a second channel connecting to the host, wherein the first channel provides faster processing of the read or write request than the second channel.

7. The computer program product of claim 4, a first subset of instances of the track format metadata in the track format table are also indicated in the track format access information, wherein only track format metadata also indicated in the track format access information can be removed from the track format table, and wherein a second subset of instances of the track format metadata in the track format table are not indicated in the track format access information.

8. The computer program product of claim 7, wherein the operations further comprise:
   in response to an access of track format metadata, determining whether the accessed track format metadata is included in the track format access information;
   incrementing the number of accesses indicated in the track format access information for the accessed track format metadata in response to determining that the track format access information indicates the accessed track format metadata; and
   adding an entry for the accessed track format metadata including a track format code and a number of accesses set to indicate one access in response to determining that the track format access information does not indicate the accessed track format metadata.

9. The computer program product of claim 8, wherein the operations further comprise:
   in response to the access of the track format metadata, determining whether the accessed track format metadata is of a type that is not included in the track format table, wherein the determining whether the accessed track format metadata is included in the track format access information, the incrementing the number of accesses, and the adding the entry are only performed in response to determining that the accessed track format metadata is not of the type that is not indicated in the track format table.

10. A system for managing read and write requests from a host to tracks in storage cached in a cache, comprising:
    a processor; and
    a computer readable storage medium having computer readable program code embodied therein that is executable to perform operations, the operations comprising:
       maintaining a track format table associating track format codes with track format metadata, wherein each instance of the track format metadata indicates a layout of data in a track, and wherein cache control blocks for tracks in the cache include track format codes associated with the track format metadata of the tracks in the cache;
       maintaining track format access information indicating accesses of track format metadata not included in the track format table; and
       adding track format metadata, indicated in the track format access information that is not in the track format table, to the track format table to associate with a track format code based on a number of accesses of the track format metadata indicated in the track format access information.

11. The system of claim 10, wherein the operations further comprise:
in response to an access of track format metadata, determining whether the accessed track format metadata is included in the track format access information;
incrementing the number of accesses indicated in the track format access information for the accessed track format metadata in response to determining that the track format access information indicates the accessed track format metadata; and
adding an entry for the accessed track format metadata including a track format code and a number of accesses set to indicate one access in response to determining that the track format access information does not indicate the accessed track format metadata.

12. The system of claim 10, wherein the track format access information indicates a number of accesses of track format metadata included in the track format table, wherein the operations further comprise:
determining, from the track format access information, a number of track format metadata instances having a greatest number of accesses, wherein the added track format metadata not in the track format table comprises the determined number of track format metadata instances having the greatest number of accesses not included in the track format table.

13. The system of claim 12, wherein the operations further comprise:
removing from the track format table the track format metadata instances not included in the determined number of track format metadata instances having the greatest number of accesses.

14. The system of claim 13, wherein the operations further comprise:
indicating track format codes, for the track format metadata removed from the track format table, in cache control blocks as invalid.

15. The system of claim 13, a first subset of instances of the track format metadata in the track format table are also indicated in the track format access information, wherein only track format metadata also indicated in the track format access information can be removed from the track format table, and wherein a second subset of instances of the track format metadata in the track format table are not indicated in the track format access information.

16. A method for managing read and write requests from a host to tracks in storage cached in a cache, comprising:
maintaining a track format table associating track format codes with track format metadata, wherein each instance of the track format metadata indicates a layout of data in a track, and wherein cache control blocks for tracks in the cache include track format codes associated with the track format metadata of the tracks in the cache;
maintaining track format access information indicating accesses of track format metadata not included in the track format table; and
adding track format metadata, indicated in the track format access information that is not in the track format table, to the track format table to associate with a track format code based on a number of accesses of the track format metadata indicated in the track format access information.

17. The method of claim 16, wherein the track format access information indicates a number of accesses of track format metadata included in the track format table, further comprising:
determining, from the track format access information, a number of track format metadata instances having a greatest number of accesses, wherein the added track format metadata not in the track format table comprises the determined number of track format metadata instances having the greatest number of accesses not included in the track format table.

18. The method of claim 17, further comprising:
in response to an access of track format metadata, determining whether the accessed track format metadata is included in the track format access information;
incrementing the number of accesses indicated in the track format access information for the accessed track format metadata in response to determining that the track format access information indicates the accessed track format metadata; and
adding an entry for the accessed track format metadata including a track format code and a number of accesses set to indicate one access in response to determining that the track format access information does not indicate the accessed track format metadata.

19. The method of claim 17, further comprising:
removing from the track format table the track format metadata instances not included in the determined number of track format metadata instances having the greatest number of accesses.

20. The method of claim 19, further comprising:
indicating track format codes, for the track format metadata removed from the track format table, in cache control blocks as invalid.

21. The method of claim 19, a first subset of instances of the track format metadata in the track format table are also indicated in the track format access information, wherein only track format metadata also indicated in the track format access information can be removed from the track format table, and wherein a second subset of instances of the track format metadata in the track format table are not indicated in the track format access information.

* * * * *